April 23, 1929.  R. S. PEARSON  1,710,003
TRAFFIC SIGNALING DEVICE
Filed Jan. 21, 1927  2 Sheets-Sheet 1
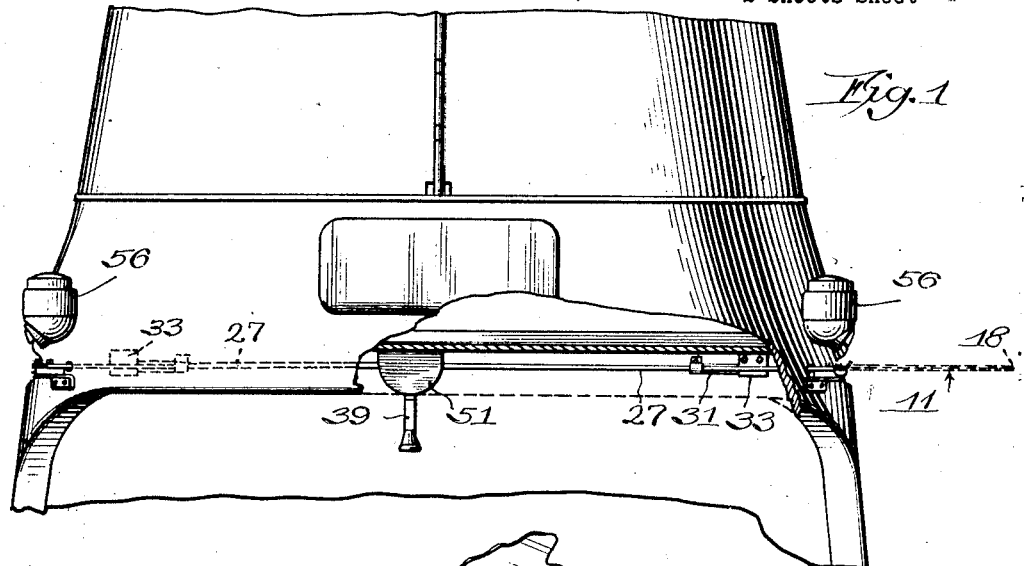
Fig. 1
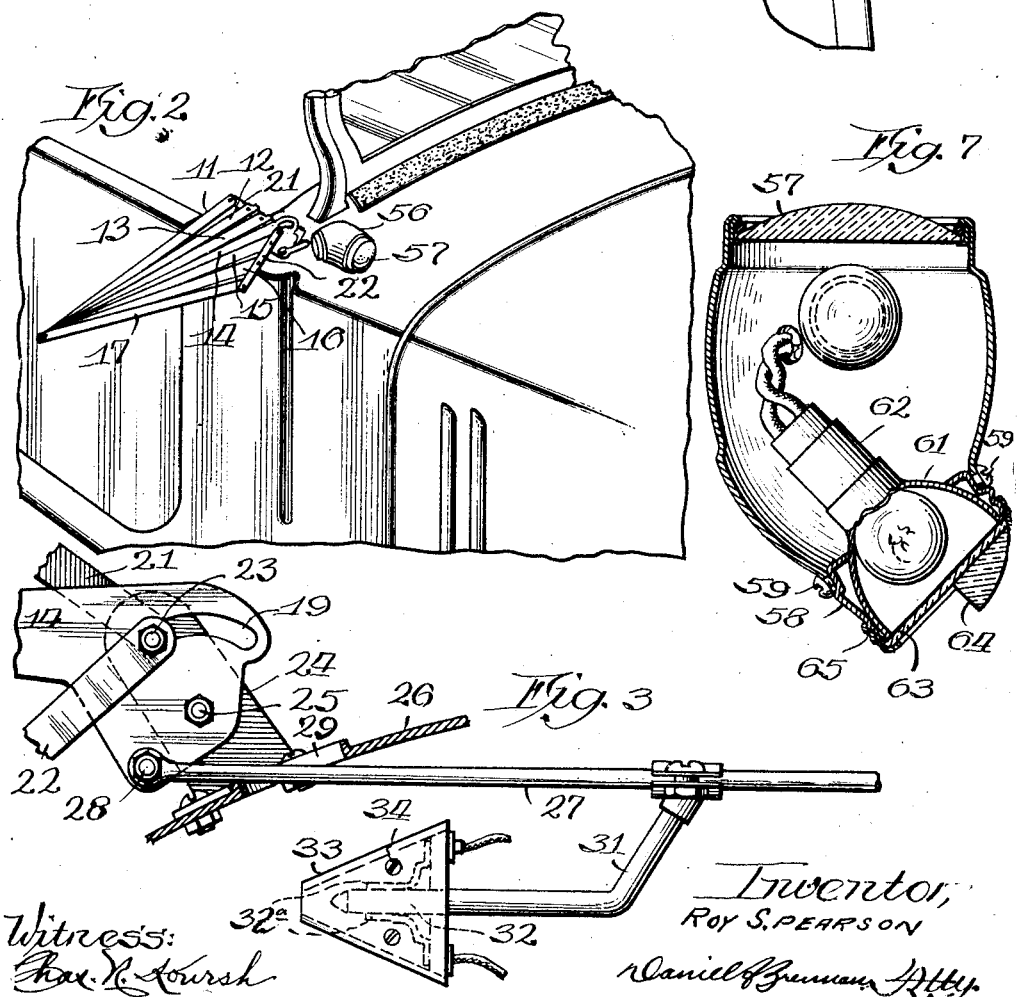
Fig. 2
Fig. 3
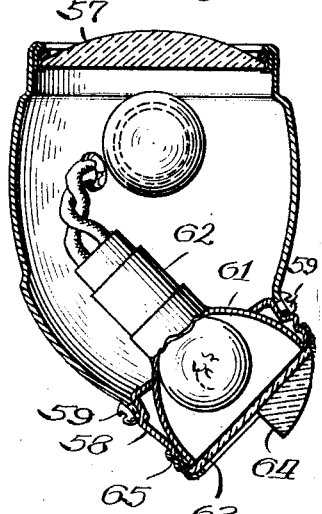
Fig. 7
Witness:
Chas. R. Koursh
Inventor,
Roy S. Pearson
Daniel J. Brennan Atty.

April 23, 1929.  R. S. PEARSON  1,710,003
TRAFFIC SIGNALING DEVICE
Filed Jan. 21, 1927  2 Sheets-Sheet 2

Witness:
Chas. R. Koursh

Inventor,
Roy S. Pearson
Daniel Brenner Atty

Patented Apr. 23, 1929.

1,710,003

UNITED STATES PATENT OFFICE.

ROY S. PEARSON, OF CHICAGO, ILLINOIS.

TRAFFIC-SIGNALING DEVICE.

Application filed January 21, 1927. Serial No. 162,576.

The invention relates broadly to traffic signaling devices for vehicles and particularly to means remote therefrom for operating semaphores on the vehicle.

An object of the invention is to provide opaque, transparent or translucent signaling semaphores for mounting on motor vehicles arranged to be swung into and out of signaling position, with associated means for illumination at night when in signaling position so that the approaching driver may see them readily and plainly.

Another object of the invention is to provide the signaling device with a semaphore that when rotating into signaling position will simultaneously unfold, that when returning to non-signaling position will simultaneously fold up compactly, and so arranged that when folded out of signaling position it will be enclosed within a groove built in the vehicle on which it is to be utilized, or be disposed adjacent the side of the car compactly.

Another object of the invention is to provide a signaling device that may be set to automatically illuminate simultaneously with the rotation of a semaphore into unfolding or signaling position or may have a continuous light, arranged to have its light rays impinge the semaphore when in signaling position, and serve as side lights when the semaphores are out of signaling position.

Another object of the invention is to provide means remote from the signal, as for example on the dash of the vehicle, for selectively or alternately operating the semaphores.

Another object of the invention is to provide auxiliary lamps associated with the cowl lamps for illuminating the semaphore when in signaling position and which may be used as side or parking lights when the car is not moving.

Another object of the invention is to provide in combination with the other elements, a cowl light having an auxiliary lamp therein, that will direct its rays of light onto the semaphore when in signaling position and provided with means to keep this light continuously burning when the semaphore reaches signaling position.

With the foregoing and such other objects in view as may appear as the description proceeds, the invention resides in the construction and arrangement of parts and in the details of construction hereinafter described and pointed out, it being understood that such changes in the precise embodiment of the invention herein disclosed may be made, as fall within the purview of what is claimed, without departing from the scope or spirit of the invention.

In the drawings:

Figure 1 is a fragmental top plan view of an automobile showing the device mounted therein with the semaphores out of signaling position, and one of its semaphores indicated in signaling position by dotted lines.

Figure 2 is a fragmental elevational view showing one of the semaphores in signaling position and the auxiliary lamp in position to illuminate it.

Figure 3 is a side elevation showing the cam end of the semaphore and a portion of its operating mechanism extending through an opening of the car.

Figure 7 is a detail horizontal sectional view of a cowl lamp having an auxiliary light formed integral therewith.

Figure 4:
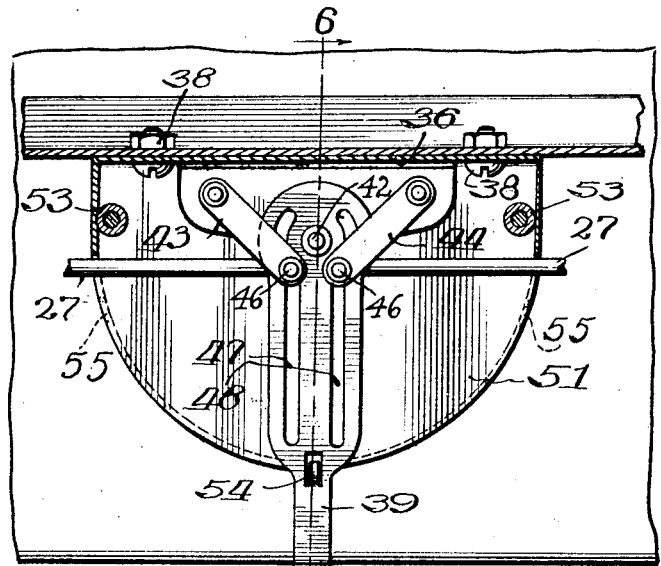
Figure 4 shows the opposite end of the operating mechanism mounted on the dash indicating its position when both of the semaphores are out of signaling position.

The semaphore comprises a plurality of blades any number of which may be used, but as illustrated in Figure 2, seven are used indicated at 11, 12, 13, 14, 15, 16 and 17. The extreme outer blades 11 and 17, and the central blade 14, are apertured at the ends 18; the remaining blades being provided with slots, at the ends 18, to provide for their sliding as the semaphore blades are folded one upon the other, during the operation of the signaling device. A pin or pivotal member extends through said apertures and slots holding them movably in place relative to each other. The central blade 14 has an enlarged end formed integral therewith, and a cam slot 19 cut therein, as best illustrated in Figure 3.

The other ends of the blades, 11, 12 and 13 are pivotally secured to the spreading link 21 and the corresponding ends of the blades 15, 16 and 17 are pivotally secured to the spreading link 22. The ends of the spreading links are disposed one on each side of the central blade 14 and secured pivotally by a pin 23 extending through the cam slot 19 fixedly into a bracket 24. The cam end of the blade 14 is pivotally secured to a bracket 24, as at 25, which is mounted on the cowl 26 of the vehicle in any approved manner.

Connecting rods 27 are pivotally secured to the lower ends of the cams, as at 28, extend through openings 29 in the cowl into the car and are connected at their other ends with the operating mechanism secured to the dash. A bent rod 31 is adjustably secured to each of the rods 27 by means of a clamp and the ends of said rods 31 form contact elements 32 disposed in position to engage one of the companion contact elements 32ᵃ secured in a casing 33 at either side to the dash by means of screws 34 as said rod is reciprocated.

Figure 6:
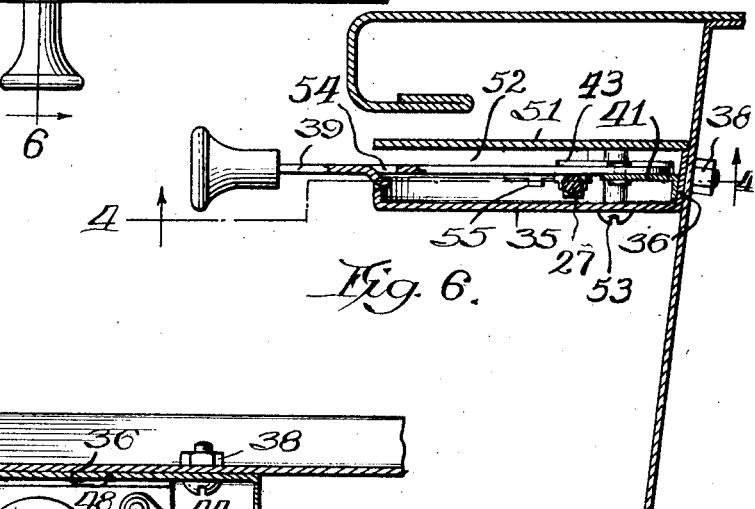
Figure 6 is a detail sectional view taken on line 6—6 of Figure 4.
Figure 5:
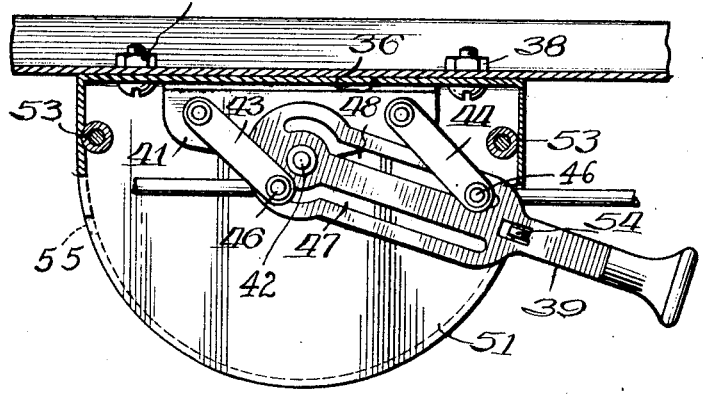
Figure 5 is a similar view indicating its position with the right hand semaphore in signaling position.

The operating mechanism, best illustrated in Figures 4, 5, and 6 comprises a casing 35 having an upwardly extending flange 36 formed integral therewith and provided with an opening in said flange for a slotted lever to operate in, and to secure it to the dash by means of bolts 38. The slotted lever 39 is pivotally secured to the bracket 41 mounted on the flange 36, by a pivotal pin 42. Lever arms 43 and 44 are also pivotally secured to the bracket 41 laterally of the slotted lever pivot 42 at one end, and at the other ends of said lever arms 43 and 44 pins 46 are secured and extend slidably through slots 47 and 48 of the slotted lever 39. To the ends of these pins, and on the under or opposite side surface of the slotted lever to which the lever arms are secured, connecting rods 27 leading to the semaphore cams, are rotatably secured.

The casing 36 has a cut-out portion or slot 52 extending over a portion of its circumference, to permit operation of the slotted lever 39. A portion 54 of the operating lever is punched out and bent downwardly to engage notches 55 in the closure plate to hold said lever in adjusted position and the screws 53 hold the casing 36 and closure 51 detachably together.

It will be obvious that upon rotation of the slotted lever that a similar rotation will be imparted to either one or the other of the semaphores depending upon in which direction it is moved, and that the notches 55 hold it in its adjusted position against any tendency to move thereabout by the vibration set up in the vehicle.

The cowl lamp, best illustrated in Figure 7, comprises the conventional lamp casing 56 and the usual lens 57 mounted therein and mounted in position on the vehicle to have the rays of light emanating therefrom, directed toward the front of the car. One side of this casing is formed with an opening and an auxiliary light casing 58 is secured therein by means of screws 59 extending through the casings of the cowl and auxiliary lamps. Within this casing 58 a reflector 61 is provided which carries a lamp 62. A glass lens 63, having a convex lens 64 secured over half of its area, is secured to the auxiliary light by means of a rim 65.

Referring to Figure 1, it will be seen that the cowl lamps 56 are secured adjacent the semaphores, with the auxiliary lamp lens directed toward the semaphore, and that the connecting rods 27 leading to the lever arms 43 and 44 are operatively connected to the slotted lever 39 and that the contact casings 33 are secured to the dash, so that when the semaphore is in extended position the contact elements 32 and 32ᵃ will be engaged with each other.

It is not intended to be limited to the exact details as shown except in so far as limited by the appended claims.

I claim:

1. In combination with an automobile having cowl lamps, a bracket secured adjacent each of said lamps, a semaphore rotatably mounted on each of said brackets and an auxiliary lamp formed in each of said cowl lamps arranged to direct its light rays on adjacent semaphore when said semaphore is in signaling position.

2. In an automobile having a cowl lamp, a semaphore mounted adjacent said cowl lamp, and an auxiliary lamp provided in the rear sideward portion of said cowl lamp to direct its light rays laterally on said semaphore when in signaling position.

3. In an automobile having a semaphore, a cowl lamp mounted adjacent said semaphore and being provided with an auxiliary lamp for illuminating said semaphore when in signaling position, said lamps together constituting a unitary structure.

In testimony whereof I affix my signature at 10 South La Salle Street, Chicago, Ill.

ROY S. PEARSON.